United States Patent Office 3,026,355
Patented Mar. 20, 1962

3,026,355
PREPARATION OF AMINES FROM AMIDES BY REDUCTION WITH A BOROHYDRIDE
Henry P. Johnston, Stillwater, Okla., assignor to Callery Chemical Company, Pittsburgh, Pa., a corporation of Pennsylvania
No Drawing. Filed July 6, 1955, Ser. No. 520,348
5 Claims. (Cl. 260—577)

This invention relates to the preparation of amines from the corresponding amides and more particularly, it relates to a new and improved method for preparing amines by the reduction of an amide with an alkali metal borohydride.

It is well known that alkali metal borohydrides are excellent selective reducing agents for a variety of organic compounds. In U.S. Patent 2,683,721 there are described methods in which these borohydrides are used for reducing an aldehyde, ketone, acid chloride, acid anhydride or ester group in the presence of double or triple bonds without reducing the double or triple bond. These reagents can also be used to reduce an aldehyde or ketone group in a molecule without simultaneously reducing another functional group such as an ester, amide, nitrile or nitro group present in the same molecule. Other reductions with alkali metal borohydrides are described in J.A.C.S., 71, 122 and J.A.C.S., 71, 3247. However, these and other references indicate that amides and other nitrogen containing groups are not reduced by borohydrides.

It is an object of this invention to provide a new and improved method for the preparation of amines by the reduction of an amide with an alkali metal borohydride.

Another object is to provide a new and useful method for preparing aniline by the reduction of acetanilide with sodium borohydride.

Other objects will manifest themselves throughout the following specification and appended claims.

This new and improved method for reducing amides to amines by the use of an alkali metal borohydride will be fully described hereinafter and the novelty thereof will be particularly pointed out and distinctly claimed.

This invention is based upon the discovery that when an intimate mixture of an alkali metal borohydride and an amide is heated in the absence of a solvent at a temperature above the melting point of the mixture, the amide is converted to the corresponding amine. When simple amides and N-substituted amides react with sodium borohydride there is formed free hydrogen and reduction products. Several competing reactions also take place. One of these is the reaction in which hydrogen is produced according to the equation:

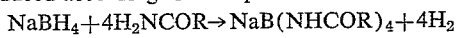

$$NaBH_4 + 4H_2NCOR \rightarrow NaB(NHCOR)_4 + 4H_2$$

where R may be $NH_2$ as in urea or any carbon containing radical as an acetamide. On the basis of this reaction with amides, a yield of hydrogen which is less than four mols per mol of borohydride indicates that reduction is taking place. To the degree by which the evolution of hydrogen is produced, a corresponding increase in the amount of reduction products may be predicted. However, due to the several competing reactions which occur, a ratio of amide to borohydride must be high to obtain maximum yields. A quantitative recovery of the boron is possible in the reaction residues which means that no hydrides of boron or other volatile boron compounds are formed.

In one experiment, n-butyl urea was heated with sodium borohydride under an ammonia atmosphere in a mol ratio of 5:1 until the reaction mixture was fused. The reaction began at 120° C. and was rapid at 130° C. Hydrogen was formed at the rate of 3.7 mols per mol of borohydride which indicated a reduction reaction was taking place. Distillation of the reaction mixture resulted in the recovery of a substantial amount of n-butyl amine. A similar experiment using a dry air atmosphere produced 3.3 mols of hydrogen per mol of borohydride and n-butyl amine was recovered in 19% yield.

In another experiment, carbanilide and sodium borohydride were reacted in a mol ratio of 7:1 under an ammonia atmosphere at 220° C. The yield of hydrogen was 0.9 mols per mol of borohydride and aniline was recovered from the reaction residue by distillation. The yield of aniline was 1.5 mols per mol of borohydride charged to the reaction. The aniline formed was identified by the formation of its acetyl and benzoyl derivatives.

In another experiment, 100 g. of acetanilide was placed in a three-neck flask fitted with a reflux condenser which was attached to a gas collection apparatus. A large bore dropping funnel was placed in the second neck of the flask and a thermometer was inserted in the third neck. The temperature was raised to 215° C. and $NaBH_4$ was added in small quantities to the acetanilide. Stirring was accomplished by means of a magnetic stirrer. Enough $NaBH_4$, was added to approximate a 7:1 mol ratio of amide to borohydride. The total reaction time was two hours. The residue was distilled in a Todd column. The first fraction which distilled at 183°–185° C. was identified as aniline by physical properties and its acetyl derivatives. Another fraction obtained at 202°–204° C. was identified as N-ethylaniline. The yield of amines from this reaction was 1.2 mols per mol of borohydride.

In still another experiment, formanilide and sodium borohydride were reacted as described in the previous experiment using a mol ratio of 6.2 to 1. A slow evolution of gas began at 55° C. which became more rapid at 70° C. The total volume of hydrogen obtained was 0.82 mol per mol of $NaBH_4$ which indicated a substantial reduction reaction had taken place. The residue was cooled and the amine fraction recovered by distillation. Only one substance was obtained which was identified as aniline. The yield of aniline was 1.33 mols per mol of borohydride.

In other experiments which were carried out, it was found that of the simple amides, formamide reacted with alkali metal borohydrides at the lowest temperature. Acetamide and benzamide reacted readily to form a relatively large amount of reduction products. Both acetanilide and benzanilide reacted with sodium borohydride at relatively low temperatures but n-butylacetamide was much less reactive while formanilide was the most reactive of this group of amides. In all the reactions the evolution of hydrogen indicated the amount of reduction taking place. Other compounds reacted with $NaBH_4$ were urethane, phenylurethane benzenesulfonamide and benzene sulfanilamide. In each of these reactions a quantitative observation based on the evolution of hydrogen indicated that a reduction took place.

Other experiments indicated that any alkali metal borohydride could be used in this reaction in place of sodium borohydride and that substantial yields of amine are obtained provided a large excess of amide to borohydride is maintained.

Having thus described this invention and disclosed what is now considered to be its best embodiment, it should be understood that within the scope of the appended claims this invention may be practiced otherwise than as specifically described.

What is desired to be claimed and secured by United States Patent is:
1. A method of preparing n-butyl amine which comprises reacting a non-gaseous, intimate, solvent-free mixture of n-butyl urea and sodium borohydride, in a mol ratio of said urea to said borohydride of at least 5 to 1, at a temperature above the melting point of said mixture and recovering the resulting n-butyl amine.

2. A method of preparing aniline which comprises reacting a non-gaseous, intimate, solvent-free mixture of carbanilide and sodium borohydride, in a mol ratio of said carbanilide to said borohydride of at least 5 to 1, at a temperature above the melting point of said mixture and recovering the resulting aniline.

3. A method of preparing an amide which comprises reacting a non-gaseous, intimate, solvent-free mixture of acetanilide and sodium borohydride, in a mol ratio of said acetanilide to said borohydride of at least 5 to 1, at a temperature above the melting point of said mixture and recovering the resulting mixture of aniline and N-ethylaniline.

4. A method of preparing aniline which comprises reacting a non-gaseous, intimate, solvent-free mixture of formanilide and sodium borohydride, in a mol ratio of said formanilide to said borohydride of at least 5 to 1, at a temperature above the melting point of said mixture and recovering the resulting aniline.

5. A method of preparing aniline which comprises heating an intimate mixture of acetanilide and sodium borohydride in a molar ratio of 7:1 at a temperature of 215° C. for two hours until all the hydrogen is evolved, then distilling the residue and separating the aniline and N-ethylaniline formed by fractionation.

References Cited in the file of this patent

UNITED STATES PATENTS 2,683,721    Schlesinger et al. _____ July 13, 1954

OTHER REFERENCES

Lithium Aluminum Hydride Bulletin, p. 4, received June 1951.

Nystrom et al.: J.A.C.S. 71, 3245–46 (1949).

Hermann: "Journal Am. Chem. Soc.," vol. 74, p. 5168, 1952.

Roth et al.: "Journal Am. Chem. Soc.," vol. 74, p. 3247, 1952.

Wessely et al.: "Montash," vol. 83, page 1156, 1952.

Gaylord: "Reduction With Complex Metal Hydrides," Interscience Publishers, Inc., New York, 1956, pp. 592–594.

Gaylord: "Reduction With Complex Metal Hydrides," Interscience Publishers, Inc., New York, 1956, pp. 544–594, and references cited therein.

Schechter et al.: "Boron Hydrides and Related Compounds," p. 52, Callery Chem. Co.